No. 770,500. PATENTED SEPT. 20, 1904.
J. N. KIRK.
SEED PLANTER.
APPLICATION FILED MAR. 31, 1904.
NO MODEL.
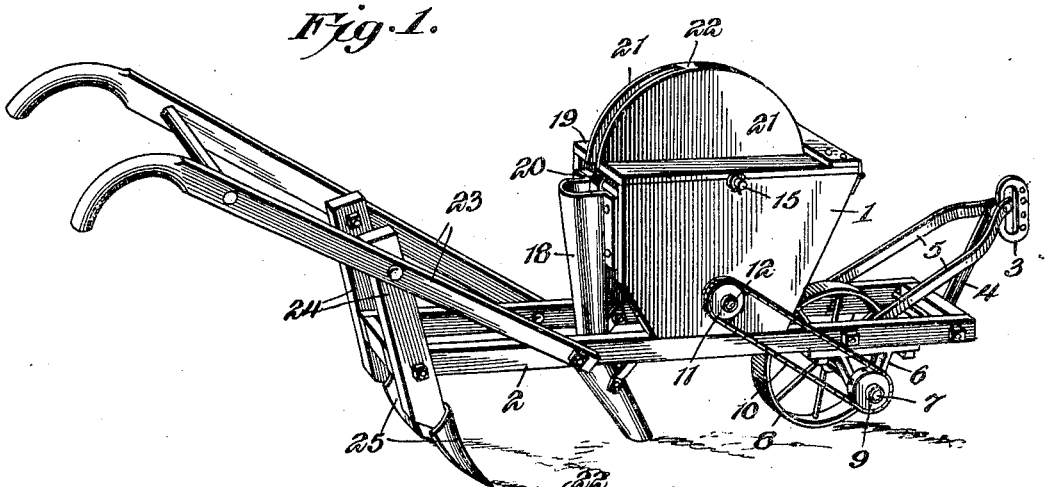
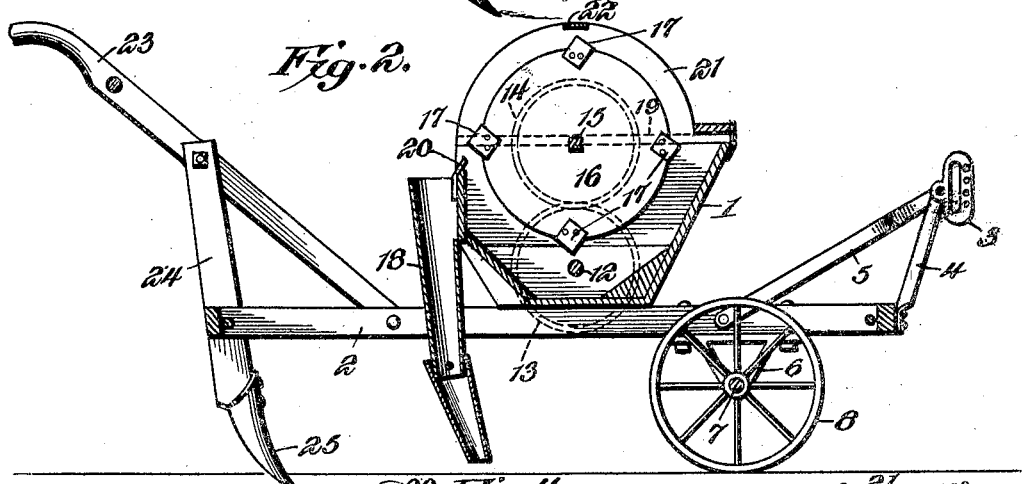
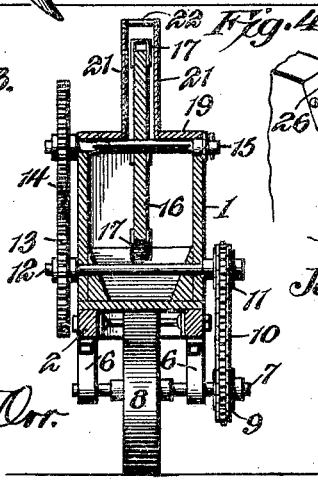
Josephus N. Kirk, Inventor,
Witnesses
Howard D. Orr.
By _____ Attorney No. 770,500.

Patented September 20, 1904.

UNITED STATES PATENT OFFICE.

JOSEPHUS N. KIRK, OF BURNET, TEXAS.

SEED-PLANTER.

SPECIFICATION forming part of Letters Patent No. 770,500, dated September 20, 1904.

Application filed March 31, 1904. Serial No. 200,921. (No model.)

*To all whom it may concern:*

Be it known that I, JOSEPHUS N. KIRK, a citizen of the United States, residing at Burnet, in the county of Burnet and State of Texas, have invented a new and useful Seed-Planter, of which the following is a specification.

The invention relates to improvements in seed-planters.

The object of the present invention is to improve the construction of seed-planters and to provide a simple and comparatively inexpensive one designed for planting corn, cotton, and other seed and capable of positively and accurately dropping the seed without crushing or otherwise injuring the same.

A further object of the invention is to provide a seed-planter of this character which will not skip and which will also enable the operator to see the grain as it is discharged, whereby the operator may readily ascertain whether the planter is working properly.

The invention also has for its object to provide a seed-planter which, although constructed to expose the planter-wheel, will be provided with means for preventing the seed from being blown from the same or being jolted therefrom when the planter is traveling over a rough surface or when it is tilted to one side.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a seed-planter constructed in accordance with this invention. Fig. 2 is a longitudinal sectional view of the same. Fig. 3 is a transverse sectional view. Fig. 4 is a detail perspective view of a portion of the feed-wheel, illustrating the construction of the seed-cups. Fig. 5 is a similar view illustrating the construction for feeding cotton-seed.

Like numerals of reference designate corresponding parts in all the figures of the drawings.

1 designates a seed-hopper mounted upon a frame 2, which is composed of side bars and connecting end bars and which is provided with suitable means for the attachment of a draft-animal. The attaching means preferably consist of a clevice 3, supported above the frame by an inclined central brace 4 and inclined side braces 5. The supporting-frame is provided at opposite sides with bearings 6, in which is journaled an axle 7, upon which is mounted a wheel 8, arranged to support the front of the planter. The axle also carries a sprocket-wheel 9, which is connected by a sprocket-chain 10 with a similar sprocket-wheel 11 of a lower horizontal shaft 12. The lower horizontal shaft, which pierces the sides of the hopper, is located at the lower portion thereof, and it may be provided with interiorly-arranged stirrer-arms for agitating the contents of the hopper. The sprocket-gearing is located at one side of the planter, and the lower horizontal shaft is connected at the opposite side by spur gear-wheels 13 and 14 with an upper horizontal shaft 15. The upper horizontal shaft is journaled in suitable bearings at the sides of the hopper, and it carries a feed-wheel 16, which is provided at its periphery with a plurality of seed-cups 17, adapted to carry one or more seed from the seed-hopper to the spout 18, located at the back of the seed-hopper.

The seed-cups may be constructed of any suitable material and may be secured to the periphery of the feed-wheel 16 by fastening devices, as illustrated in Figs 2 and 4 of the drawings, or they may be cast or otherwise fixed to the feed-wheel. Also any number of seed-cups may be employed for feeding at the desired intervals. The spout is suitably fixed to the back of the seed-hopper, and the seed-cups move upward at the front of the feed-wheel and rearward at the top thereof, and they are inverted as they pass in rear of the center of the hopper, so that their contents will be discharged into the spout 18. The seed are conveyed from the hopper to the spout without being crushed or otherwise injured. The feed-wheel shaft is preferably journaled at the upper edges of the sides of the hopper and is retained in the bearings by the cover or top 19, which is hinged at the front of the hopper and which may be secured in its closed position by any suitable means. The top or cover 19 is provided with a central longitudinal opening extending to its rear end to permit the seed to be readily discharged from the feed-wheel into the spout. An inclined guide 20 may be arranged at the top of the spout to prevent any seed from dropping back into the hopper. The upper portion of the feed-wheel is exposed to the view of the operator, and in order to prevent the seed from being blown from the feed-wheel or jarred or jolted out of the same when the planter is passing over rough surfaces or when it is tilted to one side or the other the top or cover is provided with a pair of segmental guards 21, arranged at opposite sides of the feed-wheel and extending upward from opposite sides of the same and connected at the top of the feed-wheel by a cross-piece 22. The upper edge of the segmental guards are preferably arranged concentric with the periphery of the feed-wheel, as clearly shown in Fig. 2 of the drawings, to provide walls for retaining the seed on the wheel; but any other form of shield may be employed.

The planter is provided with inclined handles 23, which are supported by standards 24, arranged at the back of the frame and extended below the same to form shanks or supports for covering-plates 25.

The seed-cups 17 (illustrated in Fig. 4) consist of sides 26 and a connecting rear wall 27, and it is adapted for feeding corn. When the planter is employed for feeding cotton-seed, the seed are conveyed to the spout by means of a seed-carrying device consisting of a fork 28, composed of two outwardly-curved sides and a transverse portion 29, connecting the sides and secured to the periphery of the wheel by suitable fastening devices, such as bolts or rivets. The seed is positively dislodged from the fork by means of an upwardly-extending stationary fork 30, of less width than the fork 28, arranged to pass between the sides of the same. The fork 30, which is composed of two sides and a connecting cross-piece, is adjustably secured to the rear wall of the hopper at the upper end of the spout by means of a clamping-blade 31 and a screw 32 passing centrally through the blade and engaging the rear wall of the hopper. Any other suitable means may be employed for adjustably mounting the stationary fork at the upper end of the spout. When the top or cover of the hopper is opened, the feed-wheel may be readily removed to afford access to the hopper, and when the top or cover 19 is closed the feed-wheel is securely retained in its bearings.

Having thus fully described my invention, what I claim as new, and desire to secure by Letters Patent, is—

1. In a planter, the combination of a hopper, a feed-wheel operating within and extending above the hopper, a cover hinged at the front to the hopper and provided with a longitudinal opening receiving the upper portion of the feed-wheel, said cover being also provided at opposite sides of the feed-wheel with segmental guards spaced apart to expose the periphery of the feed-wheel and extending beyond the same, and a spout arranged at the back of the hopper in position to receive seed from the feed-wheel, substantially as described.

2. In a planter, the combination with a hopper, a feed-wheel, and a spout, of a seed-carrying fork composed of two sides and a transverse connecting portion secured to the feed-wheel, and a relatively fixed fork composed of two sides and a connecting portion and adjustably mounted at the spout and extending between the sides of the seed-carrying fork, substantially as described.

3. In a planter, the combination of a hopper having a hinged cover provided with an opening, a feed-wheel operating in the hopper and extending upward through the opening of the cover and provided with means for carrying seed from the hopper, and guards mounted on and carried by the hinged cover of the hopper and located at opposite sides of the upper portion of the feed-wheel to prevent seed from being blown therefrom, substantially as described.

In testimony that I claim the foregoing as my own I have hereto affixed my signature in the presence of two witnesses.

JOSEPHUS N. KIRK.

Witnesses:
 GEO. T. LAMON,
 JOHN STEELE.